United States Patent [19]

Pallerberg et al.

[11] Patent Number: 5,221,539

[45] Date of Patent: Jun. 22, 1993

[54] APPARATUS FOR THE PRODUCTION OF MOLDED SKINS AND BODIES OF PLASTIC MATERIAL

[75] Inventors: Wilfried Pallerberg, Bötzingen; Detlef Lackmann, Teningen-Köndringen, both of Fed. Rep. of Germany

[73] Assignee: Peguform-Werke GmbH, Botzingen, Fed. Rep. of Germany

[21] Appl. No.: 844,796

[22] Filed: Mar. 2, 1992

[30] Foreign Application Priority Data

Mar. 5, 1991 [DE] Fed. Rep. of Germany ....... 4106964

[51] Int. Cl.⁵ .......................................... B29C 41/18
[52] U.S. Cl. .................................. 425/144; 264/302; 264/310; 264/DIG. 60; 425/429; 425/435; 425/182
[58] Field of Search ............... 264/302, 303, 310, 327, 264/DIG. 60; 425/144, 429, 182, 435, 425, DIG. 246; 249/79, 137

[56] References Cited

U.S. PATENT DOCUMENTS

| | | | |
|---|---|---|---|
| 3,337,662 | 8/1967 | Spencer | 425/429 |
| 3,565,986 | 2/1971 | Byall | 264/302 |
| 4,621,995 | 11/1986 | Wersosky | 425/144 |
| 4,623,503 | 11/1986 | Anestis et al. | 264/327 |
| 4,867,660 | 9/1989 | Nagase et al. | 425/435 |
| 5,106,285 | 4/1992 | Preston | 425/144 |

FOREIGN PATENT DOCUMENTS 63-98408  4/1988  Japan ................................... 264/302

Primary Examiner—Scott Bushey
Attorney, Agent, or Firm—Gifford, Groh, Sprinkle, Patmore and Anderson

[57] ABSTRACT

An apparatus for the production of molded shells and bodies of plastic material by a rotational molding procedure within an electroplate mold includes a double-walled hollow body which is heated up and cooled down by a heating and cooling medium. A box which contains plastic material can be fitted on to the mold. The mold and the box are jointly pivotable so that the plastic material can pass into the mold and fuse at the wall of the mold. At its rear wall, which is remote from the internal contour which produces the molding action, the double-walled hollow body has a multiplicity of intake and discharge openings for the heating and cooling medium so that heating and cooling can be effected specifically and quickly. The total discharge cross-section is greater than the total feed cross-section whereby the hollow body remains substantially pressure-less. The mold may simultaneously perform a rotary movement about an axis, a pivotal movement about a second axis and translatory movements in the direction of the axis of rotation, in a freely programmable fashion.

8 Claims, 2 Drawing Sheets

APPARATUS FOR THE PRODUCTION OF MOLDED SKINS AND BODIES OF PLASTIC MATERIAL

BACKGROUND OF THE INVENTION

1. Field of the Invention

The invention relates to an apparatus for the production of molded skins or shells and molded bodies from plastic material, and a method of manufacture and use of such an apparatus.

DESCRIPTION OF THE RELATED ART INCLUDING INFORMATION DISCLOSED UNDER 37 CFR 1.97-1.99.

Apparatuses and methods for the production of molded skins or shells are known. Such methods are also referred to generally by the term 'rotational molding'. In such methods, molds which are generally produced galvanically by the deposit of metals are filled with a plastic material which is in a condition of being capable of flow, or a liquid plastic material. With heat being supplied, a thin layer of plastic material adheres to the surface of the mold and the remaining plastic material can be shaken out or poured out, by rotating the mold. When the mold is further heated, the skin or shell clinging thereto gells out or undergoes curing when using reactive materials. The finished skin or shell can be removed after the mold has cooled down. The operation of introducing the plastic material which is in a condition of being capable of flow, in the form of a powder or granulate, is effected by fitting the mold which is rotated with its opening downwardly, on to a box which contains the plastic material. The unit consisting of the mold and the box is then turned through 180° so that the plastic material drops into the mold. After the plastic skin or shell has set, the unit can be turned back again.

Heat is supplied by putting the mold into a hot air chamber at an accurately regulated temperature. In that procedure however a comparatively long period of time is required for the mold to be sufficiently heated. The same applies to the subsequent cooling phase. A method and an apparatus of the kind described hereinbefore are known for example from German patent specification No. 3 417 727.

To avoid hot air chambers or ovens and thus in order to accelerate the phases of heating up and cooling down the mold, a double-wall mold has also already been used (British patent specification No 1,159, 327). Hot or cold oil is pumped into the intermediate space between the two walls of the mold, for heating it up and for cooling it down respectively.

SUMMARY OF THE INVENTION

The underlying object of the present invention is that of further developing the above-indicated apparatus and the corresponding method, in such a way that it is also possible in particular to produce complicated articles, even with different wall thicknesses.

Due to the multiplicity of intake openings for the heating and cooling medium, for example oil, and the parallel connection thereto to a feed system, the mold can be very quickly heated up and cooled down uniformly over its entire surface at the same time. As the total discharge cross-section due to the outlet openings being of appropriate dimensions is greater than the feed cross-section, the mold itself remains pressure-less so that no additional loading and deformation occurs.

Developments of the invention are the subject-matter of the subsidiary claims. Thus it may be provided that the intake openings are in the form of injection or spray nozzles which are directed on to the inside of the front wall. The number and arrangement of the intake openings or nozzles may be selected, in consideration of the respective mold properties involved. If for example, by virtue of being produced galvanically, the mold wall has inevitable differences in its wall thickness, the feed of the heating and cooling medium can be concentrated at those locations.

The front wall which produces the molding action and which, by virtue of its preferred method of manufacture by means of a galvanic process, is also referred to as the 'electroplate', is desirably replaceably fixed to the rear wall of the mold. It is then possible only to replace the electroplate, when making changes to the mold. A corresponding consideration applies in the event of damage.

So that the mold can be conveniently rotated in a known manner, a development provides that the mold with the feed and discharge systems and the box with the plastic material are arranged in a frame which is rotatable about a horizontal axis. The feed and discharge of the heating and cooling medium from the exterior to the feed system and from the discharge system in the mold is advantageously effected by way of rotary couplings in the region of the rotary mountings of the frame.

To provide for uniform distribution of the plastic material in the mold, such as to reach even parts of the mold which are of an undercut and complicated configuration, only the mold which has a support frame is adapted to be reciprocated in the direction of the axis of rotation, during the rotary movement. The feed and discharge conduits which are secured thereto are adapted to be movable for that purpose. In that arrangement the intake and outlet openings may be individually connected to the feed and discharge systems respectively by way of respective movable conduits, for example hoses. In order to limit the number of movable conduits it is possible for the intake and discharge openings firstly to be connected by way of rigid conduits to a respective one or more intermediate pipes which then lead to the feed or discharge system respectively, by way of movable conduits. There is the advantage in both cases that the entire mass of the installation does not also have to be moved. The speed of movement, amplitude, motion profile and frequency can be freely selected. In addition the frame can be adapted to be pivotable about the transverse axis, by means of a lift device.

A method of producing molded skins or shells and molded bodies, using an apparatus according to the invention, provides that the operation of fitting the box to the mold, the pivotal movement and possibly translatory movements of the mold in the axial and vertical directions and the temperature profile of the heating and cooling medium are effected with a freely programmable control. In that way it is possible to produce and combine any programs in respect of movement and temperature. Then, desirable values, once found, can be exactly reproduced, and uniform manufacture can be achieved.

BRIEF DESCRIPTION OF THE DRAWINGS

An embodiment is described hereinafter by way of example with reference to the drawings in which.

DESCRIPTION OF THE PREFERRED EMBODIMENT

Figure 1:
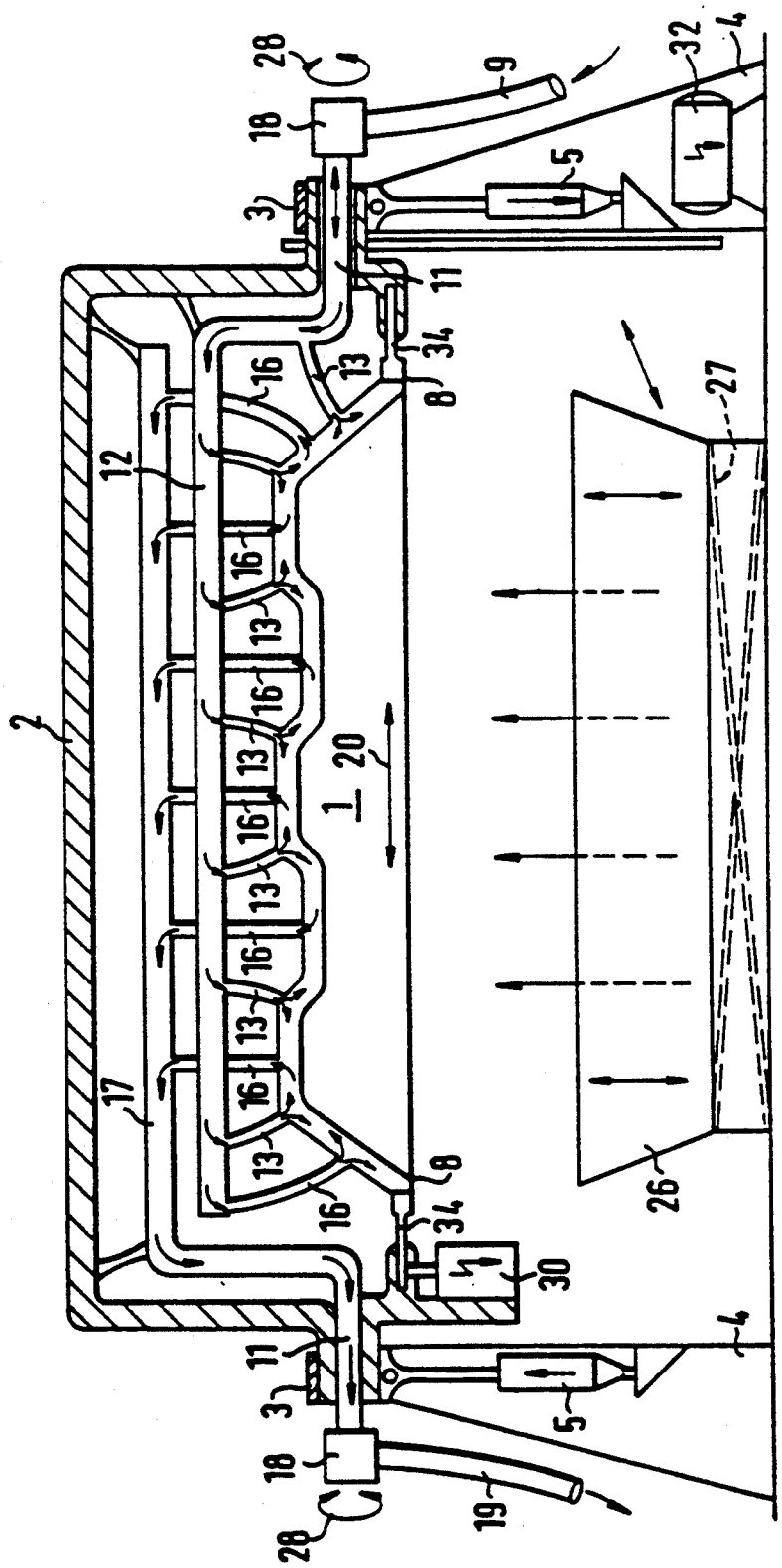
FIG. 1 is a diagrammatic front view in partial section of an apparatus according to the invention.

In the apparatus shown in FIG. 1, a mold 1 is displaceably fixed in a frame 2 and the frame 2 is rotatably mounted. The mountings 3 are carried by supports 4 and can be moved upwardly and downwardly in opposite directions, as indicated by the double-headed arrows, by means of hydraulic cylinders 5 which are only indicated in the drawing. The mold 1 has an inside wall 6 which serves to provide the shaping or molding action and which is also referred to as the electroplate, and a rear wall 7 disposed at a small spacing of for example between 10 and 20 mm. The two walls are sealed off by means of a support frame 8 and are connected together in such a way that the electroplate 6 can be replaced. The support frame 8 serves at the same time for fixing in the rotary frame 2, the fixing permitting a movement of the support frame 8 in the direction of the axis of rotation (arrow 20).

Figure 2:
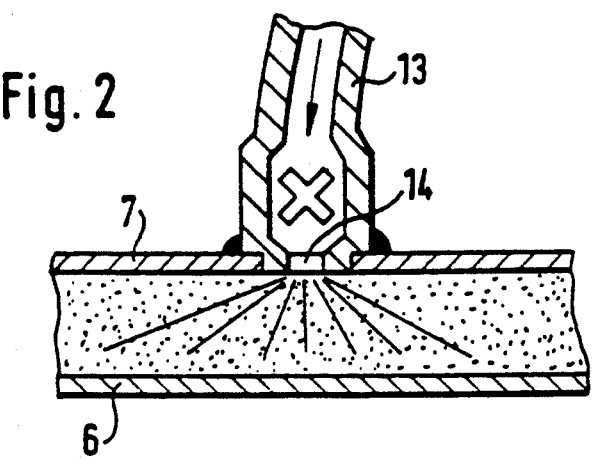
FIG. 2 shows part of the mold used in the apparatus of FIG. 1, in the region of an injection nozzle.

The feed of the heating and cooling medium is effected from a heating and cooling installation (not shown) of adequate heating and cooling capacity, by way of a conduit 9, through a rotary coupling 18 and a pipe 11 to the feed system in the form of a manifold pipe 12. Movable individual conduits 13 go from the pipe 12 to the intake openings 14 in the form of injection nozzles which are shown in greater detail in FIG. 2. The medium is discharged through discharge openings 15 from which movable communicating conduits 16 lead to a further manifold pipe 17 which in turn is connected by way of a rotary coupling 18 and a conduit 19 to the heating and cooling installation (not shown). The heating and cooling installation desirably includes heat exchangers, in a known manner, so that the amount of energy expenditure can remain low.

Figure 3:
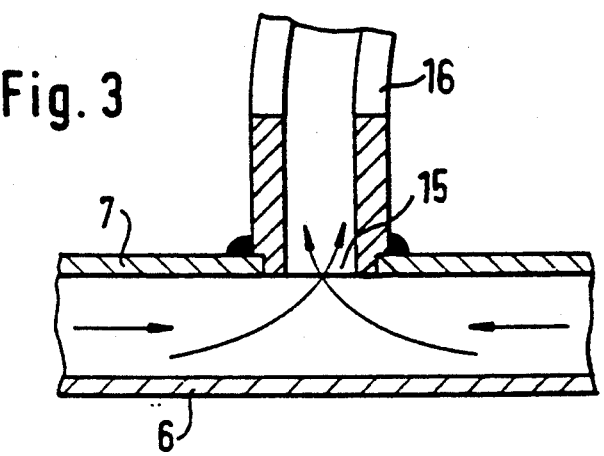
FIG. 3 is a partial view similar to FIG. 2, in the region of a discharge opening, and FIG. 4 diagrammatically shows the distribution of intake and discharge openings in the mold.

As shown in FIG. 3, the discharge or outlet openings 15 are substantially larger in cross-section than the intake openings or injection nozzles 14. Even if the number of discharge openings 15 is smaller (see FIG. 4) than the number of injection nozzles 14, nonetheless the total discharge cross-section is substantially greater than the total feed cross-section, whereby the pressure of the heating and cooling medium in the space between the walls 6 and 7 remains low. That eliminates deformation phenomena in particular in respect of the electroplate 6, and thus alterations in the mold.

Figure 4:
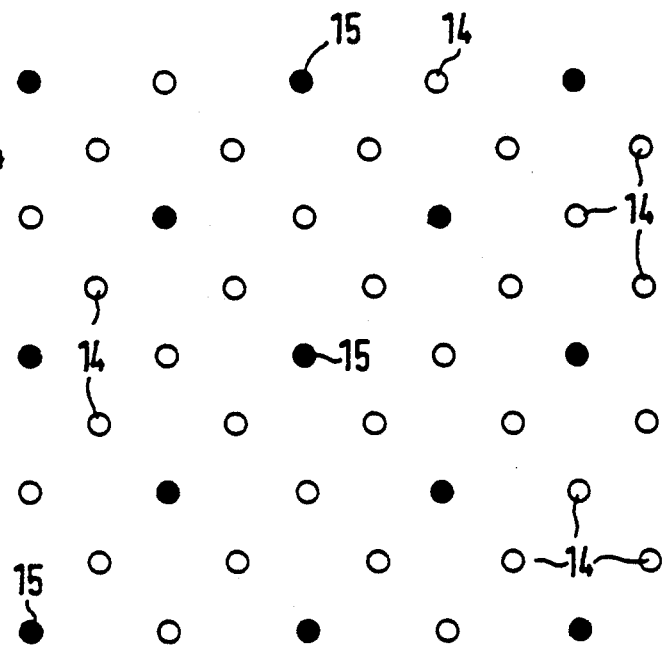

An example of the arrangement and distribution of the intake openings 14 and discharge openings 15 is diagrammatically shown in FIG. 4. The distribution of the openings 14 and 15 may be asymmetrical in order to compensate for different wall thicknesses of the electroplate 6 or for desired effects on the respective workpiece. For example, at locations at which a greater amount of heat needs to be supplied or removed, the intake openings 14 may be arranged closer together.

The box 26 for containing the plastic material in powder form is also only diagrammatically shown in FIG. 1. As shown in broken line, it may also include two or more discharge conduits for plastic material of different colours or different materials so that components having correspondingly different regions can be produced. The box 26 is moved by means of a lifting device 27 towards the mold and at that location is sealingly fixed in position after docking to the support frame 8. It can then be rotated together with the rotary frame 2 and the mold 1 (arrow 28), with the plastic material then filling the mold 1.

If the lifting device 27 which can also permit displacement of the box 26 is of a precise configuration, then, in conjunction with the rear wall 7 which is accurately held and fixed in position by the support frame 8 and additional components, and therewith the electroplate 6, it is possible to achieve a high degree of repetitional accuracy in regard to coupling and also changing the box 26 and possibly further boxes. In that way, it is also possible for the box 26, or certain regions of the box, to be introduced into the electroplate configuration, with a sealing action even in relation to a highly complicated contour.

The step of heating the mold can be initiated at full power as quickly as possible, even prior to the box 26 being docked with the support frame. In order to increase speed, it is also possible for the desired reaction end temperature to be briefly exceeded, at the beginning. After the desired temperature of for example 240° C. is reached, a motion program is begun. For that purpose, firstly the frame 2 with the mold 1 is rotated for shaking the plastic material out of the box 26 into the mold 1, as already stated above. Depending on the respective mold, in accordance with a program which has been previously ascertained on an empirical basis, a tilting movement is additionally produced by means of the cylinder 5, as well as a translatory movement in the direction of the axis of rotation, as indicated by the doubleheaded arrow 20, by means of the motor 30. The angle and speed of rotary movement and the forward or reverse rotary movement follow a given program. The same applied to the number of revolutions and the length of each respective cycle. In that way even highly complicated mold geometries can be uniformly filled with plastic powder or even a liquid.

During the mold movements, the plastic material melts on the mold wall 6, while there is possibly also a reaction in the form of curing or cross-linking. The amounts of heat which are required in that phase are provided by suitable temperature regulation of the heating medium, in such a way that the wall 6 is at the most advantageous temperature. The temperature of the discharge flow of medium is measured in that case, for temperature regulation purposes.

After a period of time which is also established empirically and which depends on the respective plastic material and also the desired wall thickness, the frame 2 with the mold 1 and the box 26 is rotated back again so that the excess plastic material is again collected in the box 26. The return flow can be assisted in that respect by rotary and lifting movements, which are also programmed. The temperature of the mold is then so regulated as to provide for either post-gelling of the molten plastic material (in the case of thermoplastic materials) or post-reaction (in the case of reactive plastic material). Here too the entire unit may again perform a rotary program in order to prevent liquid material from dripping off. At the same time the box 26 is returned, after being uncoupled. The mold 1 is then cooled down, at full cooling capacity, and then the respective component produced is removed.

The apparatus for producing the rotary movement, which is not shown in detail, comprises a controllable rotary motor 32 and a thrust device 34 which is operated by the motor 30 for producing the translatory reciprocating movement of the support frame 8 in the direction indicated by the double-headed arrow 20. In that connection, the rotary movement can be freely adjusted so that it is possible to use rotary programs with any desired speed profiles, directions of rotation and intermediate stops, in a range of over 360°. The translatory movements and also the lifting movements can be selected in a programmed fashion, irrespective of the rotary movements, so as to be of adjustable amplitudes, speeds and motion profiles.

We claim:

1. An apparatus for the production of molded shells and bodies from plastic material, comprising;
    a mold which is in the form of an electroplate and having an internal contour which provides the mold shaping action and which is in the form of a double-walled body for feed of a heating and cooling medium;
    a box which is sealingly fitted to the mold and which contains plastic material; and
    a means for rotating the mold and the box, comprising at a rear wall of the mold which is remote from an inside wall of the mold, the double-walled hollow body having a plurality of intake and discharge openings for the heating and cooling medium, such that the intake openings on the one hand and the discharge openings on the other hand are each connected in parallel to a feed system and a discharge system respectively, and that a total discharge cross-section is greater than a total feed cross-section.

2. The apparatus according to claim 1 comprising the intake openings being in the form of spray nozzles which are directed on to an inside of the inside wall.

3. The apparatus according to claim 1 comprising the arrangement of the intake openings being irregular.

4. The apparatus according to claim 1 comprising the inside wall which produces the mold shaping action being interchangeably secured to the rear wall of the mold.

5. The apparatus according to claim 1 comprising the mold with the feed and discharge systems and the box with the plastic material being arranged in a rotary frame which is rotatable about a horizontal axis.

6. The apparatus according to claim 5 comprising the feed and discharge of the heating and cooling medium to the feed system and from the discharge system being effected by way of rotary couplings in the region of the mountings of the rotary frame.

7. The apparatus according to claim 5 comprising the mold having a support frame which reciprocates about a vertical axis and that the intake openings are connected to the feed system and the discharge openings are connected to the discharge system by way of movable conduits.

8. The apparatus according to claim 5 comprising a tilting movement being introduced to the rotary frame by means of a lift device.

* * * * *